United States Patent
Isaacson et al.

(10) Patent No.: US 10,547,167 B2
(45) Date of Patent: Jan. 28, 2020

(54) UTILITY ENCLOSURE APRON

(71) Applicant: Hubbell Incorporated, Shelton, CT (US)

(72) Inventors: Gregory Glenn Isaacson, Fallbrook, CA (US); Michael Edward Fisher, Knoxville, TN (US); Jeffery Scott Huffstetler, Friendsville, TN (US)

(73) Assignee: HUBBELL INCORPORATED, Shelton, CT (US)

( * ) Notice: Subject to any disclaimer, the term of this patent is extended or adjusted under 35 U.S.C. 154(b) by 53 days.

(21) Appl. No.: 15/603,247

(22) Filed: May 23, 2017

(65) Prior Publication Data
US 2017/0346269 A1 Nov. 30, 2017

Related U.S. Application Data

(60) Provisional application No. 62/340,935, filed on May 24, 2016.

(51) Int. Cl.
| | |
|---|---|
| *B65D 83/38* | (2006.01) |
| *H02G 9/02* | (2006.01) |
| *B28B 7/00* | (2006.01) |
| *B28B 23/00* | (2006.01) |
| *B28B 23/02* | (2006.01) |

(52) U.S. Cl.
CPC .......... *H02G 9/025* (2013.01); *B28B 7/0064* (2013.01); *B28B 23/0056* (2013.01); *B28B 23/02* (2013.01)

(58) Field of Classification Search
CPC ........ H02G 9/025; H02G 9/10; B28B 23/005; B28B 23/0006; B28B 7/0064; B28B 23/0056; B28B 23/02; B28B 7/18
USPC .................... 220/484, 4.02; 277/590; 404/25
See application file for complete search history.

(56) References Cited

U.S. PATENT DOCUMENTS

| | | | |
|---|---|---|---|
| 3,364,299 A | 1/1968 | Hamilton | |
| 4,068,430 A * | 1/1978 | van der Lely | E04B 1/34815 52/264 |
| 4,593,714 A | 6/1986 | Madden | |
| 4,793,387 A | 12/1988 | LeBlanc et al. | |
| 4,867,601 A | 9/1989 | Bowman | |
| 5,021,261 A * | 6/1991 | Bowman | E02D 29/124 427/286 |
| 5,201,151 A | 4/1993 | LeBlanc | |
| 5,533,641 A | 7/1996 | Argandona | |
| 8,302,796 B1 | 11/2012 | Johnson | |
| 10,184,222 B2 * | 1/2019 | Bruce | B28B 21/02 |
| 2002/0012570 A1 | 1/2002 | Licata | |
| 2003/0047658 A1 * | 3/2003 | Peter | F16M 11/22 248/346.01 |
| 2014/0117660 A1 * | 5/2014 | Smith | H02G 3/083 285/141.1 |
| 2015/0263502 A1 | 9/2015 | Tipton | |
| 2016/0069039 A1 | 3/2016 | Johnson et al. | |
| 2018/0195281 A1 * | 7/2018 | Tanami | E04C 3/29 |

OTHER PUBLICATIONS

International Search Report and Written Opinion mailed in corresponding PCT/US17/34073 dated Oct. 31, 2017 (13 pages).

* cited by examiner

*Primary Examiner* — Kareen K Thomas
(74) *Attorney, Agent, or Firm* — Wissing Miller LLP

(57) ABSTRACT

Precast utility enclosure aprons for buried utility enclosures that have an angled top surface to direct water, ice and debris away from the center of the apron and to limit damage to the apron and utility enclosure caused by impacts to the apron.

33 Claims, 15 Drawing Sheets

UTILITY ENCLOSURE APRON

CROSS REFERENCE TO RELATED APPLICATIONS

The present application is based on and claims benefit from U.S. Provisional Application Ser. No. 62/340,935 filed May 24, 2016 entitled "Utility Enclosure Apron" the entire contents of which are herein incorporated by reference.

BACKGROUND

Field

The present disclosure relates generally to aprons for utility enclosures and, more particularly, to precast aprons for buried utility enclosures that have an angled top surface to direct water, ice and debris away from the center of the apron and to limit damage to the apron and utility enclosure from impacts.

Description of the Related Art

Utility companies, such as water, electric, gas, and/or cable television utilities often use subterranean conduits and enclosures to deliver their product to customers. For example, electrical utilities run electrical wires through underground conduits and provide workman access to such wires using buried utility enclosures that have covers at or slightly above grade. The utility enclosures can be buried in the ground, or under roads or sidewalks. The tops of buried enclosures when installed can often be subject to impact from equipment, such as lawn mowers. Replacing damaged enclosures is expensive. To protect buried utility enclosures from impact damage, workmen installing the underground enclosures often dig a trench or form around the top of the enclosure and pour a concrete platform that surrounds the enclosure and is flush with the top of the enclosure. However, returning to the worksite multiple times to dig a trench around the enclosure, pour the concrete, allow the concrete to set, remove safety cones and other equipment after the concrete sets, and to clean the overall worksite by leveling the grade and seeding bare soil, if necessary, takes time and increases the cost to install each underground utility enclosure.

SUMMARY

The present disclosure provides embodiments of utility enclosure aprons. In one exemplary embodiment, the utility enclosure apron includes a looped member having a top surface, a bottom surface, an outer edge between the top surface and the bottom surface, a center opening and an inner edge between the top surface and the bottom surface around the center opening. The top surface is a tapered surface such that a thickness of the inner edge is greater than a thickness of the outer edge.

The present disclosure also provides embodiments of utility enclosure kits. In one exemplary embodiment, the utility enclosure kit includes a utility enclosure configured for underground installation, and a utility enclosure apron configured to be positioned to surround a top surface of the utility enclosure. The utility enclosure apron includes a looped member having a top surface, a bottom surface, an outer edge between the top surface and the bottom surface, a center opening and an inner edge between the top surface and the bottom surface around the center opening. The top surface is a tapered surface such that a thickness of the inner edge is greater than a thickness of the outer edge. The center opening is configured to fit around a top portion of the utility enclosure.

The present disclosure provides embodiments of molds for fabricating utility enclosure aprons. In one exemplary embodiment, the mold includes a tub and a frame. The tub includes a support member, a center rib and a recess. The support member has a ledge that extends around a perimeter of the support member and rests on the frame. The support member also includes a wall used to form an outer edge of a utility enclosure apron. The center rib is used to form a hollow center of the utility enclosure apron and includes a wall used to form an inner edge of the utility enclosure apron. The recess is located between the support member and the center rib. The recess has a face used to form a top surface of the utility enclosure apron. The face is tapered so that a width of the recess is at its greatest at the wall of the center rib and so that a width of the recess is narrower at the wall of the support member.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Exemplary embodiments of the present disclosure may be provided as improvements to utility enclosures by providing a precast utility enclosure apron that allows for water, ice and debris runoff and protects the utility enclosure apron and the utility enclosure from impacts, especially side impacts. According to one exemplary embodiment the utility enclosure apron includes a looped member having a top surface, a bottom surface, an outer edge between the top surface and the bottom surface, a center opening and an inner edge between the top surface and the bottom surface around the center opening. The top surface is a tapered surface such that a thickness of the inner edge is greater than a thickness of the outer edge.

Exemplary embodiments of the present disclosure also provide molds for fabricating the utility enclosure aprons. According to one exemplary embodiment the utility enclosure apron mold includes a tub and a frame.

In some embodiments, the utility enclosure apron described herein may be fabricated from concrete, such as a durable, corrosive resistant, high strength, low permeability concrete. An example of such a suitable concrete is polymer concrete. In other embodiments and to increase the strength of the utility enclosure apron, the apron may be fabricated from concrete reinforced with fiberglass sheets embedded in the concrete near, for example, the top and bottom surfaces of the utility enclosure apron. In other embodiments, and to decrease the weight of the utility enclosure apron, the apron may be fabricated from concrete or fiberglass reinforced concrete with lightweight filler members embedded in the apron.

Figure 1:
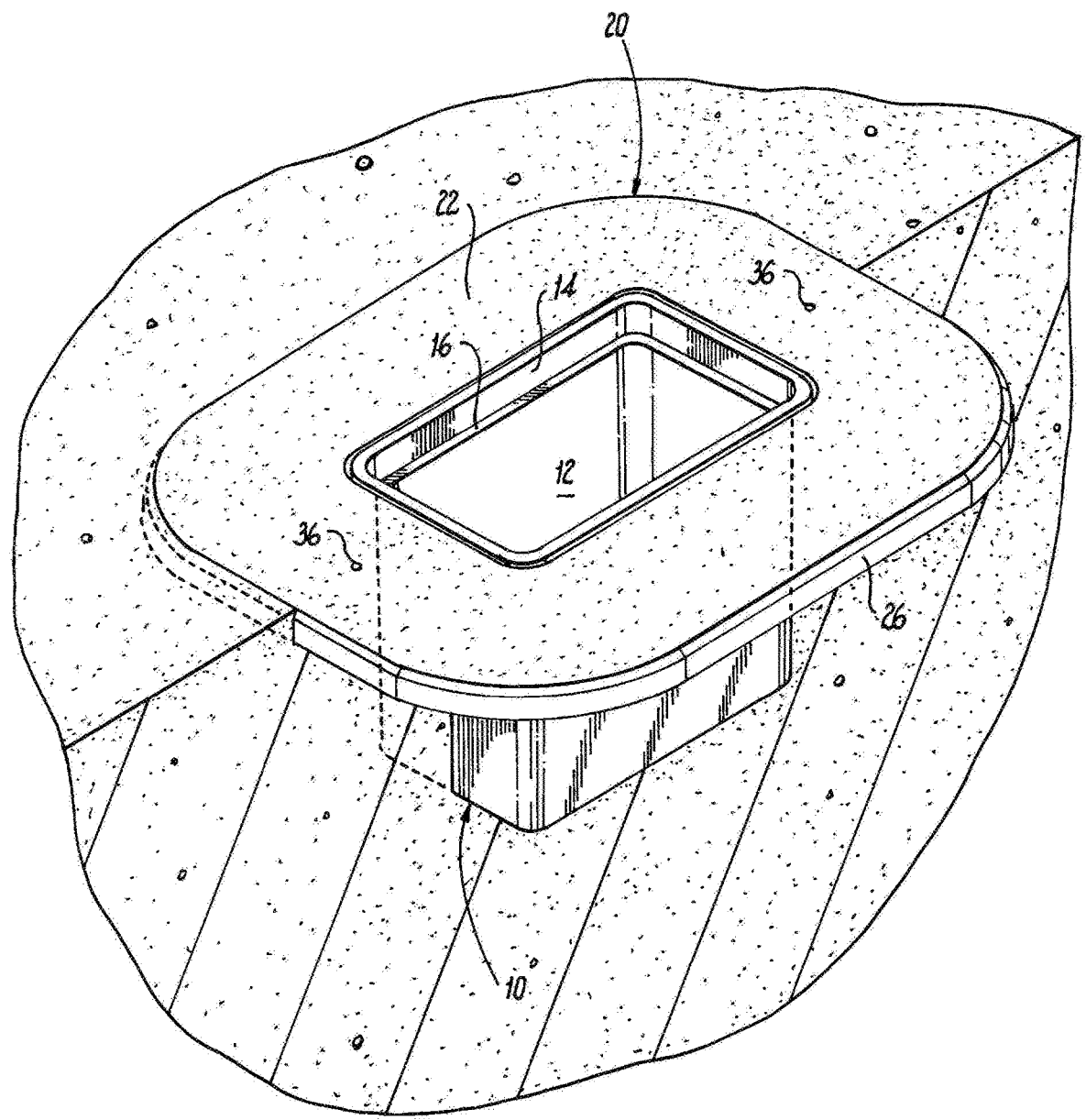
FIG. 1 is a top perspective view of an exemplary embodiment of a precast utility enclosure apron according to the present disclosure positioned around a utility enclosure buried in the ground.
Figure 2:
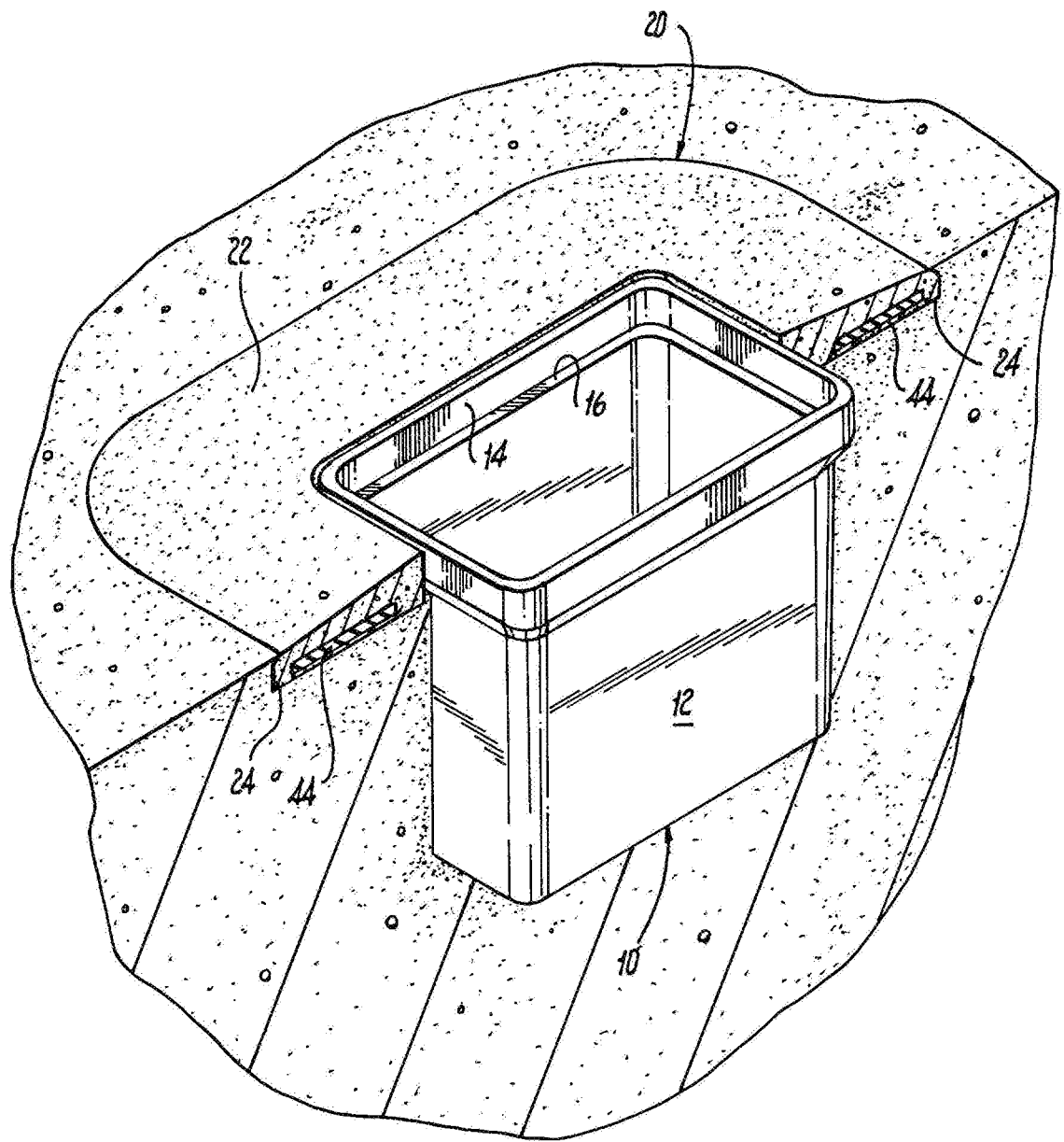
FIG. 2 is a top perspective view with part of the soil removed to reveal a cross-section of the utility enclosure apron of FIG. 1.

Referring now to the figures, an exemplary embodiment of a utility enclosure apron according to the present disclosure is shown and described. For ease of description the utility enclosure apron may be referred to herein as the "apron." The apron 20 is a looped member configured to fit around a perimeter of a top portion of a utility enclosure 10 as shown in FIGS. 1 and 2. In this exemplary embodiment, the apron is a continuous loop. However, the loop may be a split loop that is joined together as shown in FIGS. 17-21. The apron 20 serves a number of purposes. For example, the apron 20 acts as a buffer between the utility enclosure 10 and equipment that may impact the side of the utility enclosure, such as a lawn mower. As another example, the apron 20 stabilizes the buried utility enclosure by minimizing disruption to the soil around the utility enclosure.

Figure 3:
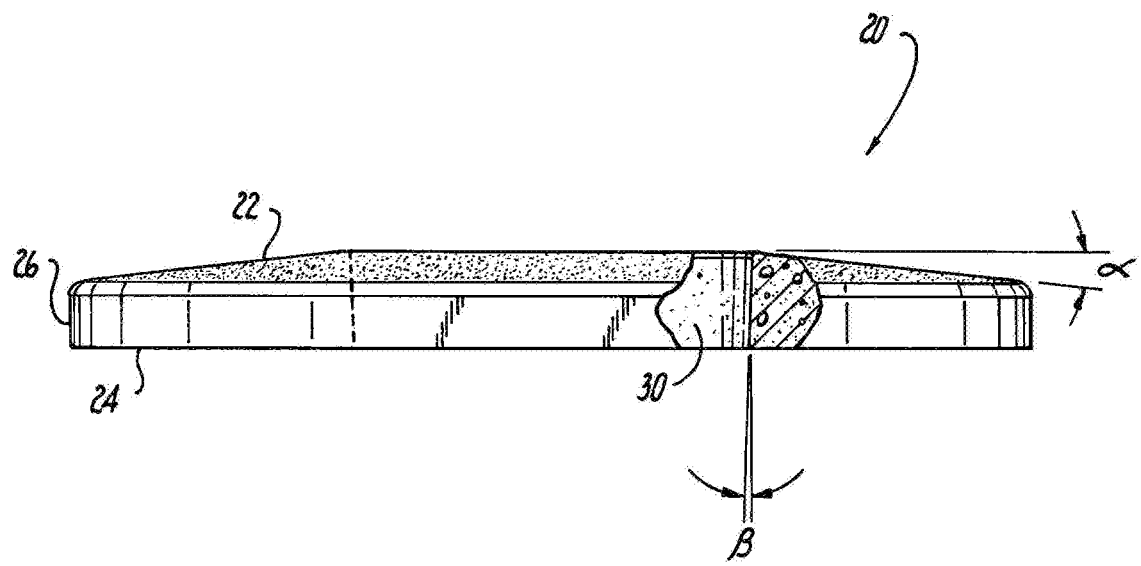
FIG. 3 is a side elevation view of the utility enclosure apron of FIG. 1.
Figure 4:
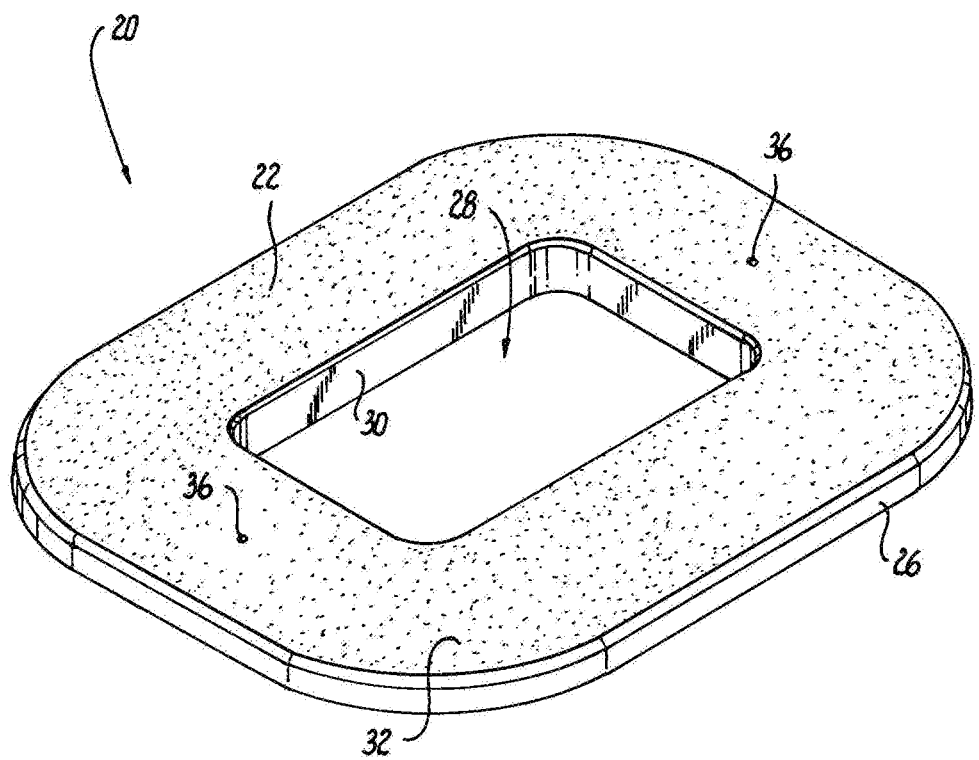
FIG. 4 is a top perspective view of the utility enclosure apron of FIG. 1, illustrating a skid resistant surface formed as part of a top surface of the utility enclosure apron.

Referring to FIGS. 3 and 4, the apron 20 has a top surface 22, a bottom surface 24, an outer edge 26 between the top surface and the bottom surface, a center opening 28 and an inner edge 30 around the center 28 and between the top surface and the bottom surface. The top surface 22 is angled or tapered, as seen in FIG. 3, sufficient to allow water, ice and debris to runoff the apron 20 away from the center 28. The slope of the top surface 22 may be in the range from about ½ of an inch to about 6 inches, where the slope angle "α" may be between about 3 degrees and about 15 degrees. As an example, the slope of the top surface 22 may be 1 inch starting from the inner edge 30 and ending at the outer edge 26. Such a slope would generally equate to a slope angle "α" of about 6 degrees. To achieve, for example, a 1-inch slope and maintain the structural integrity of the apron, the thickness of the inner edge 30 of the apron 20 may be between about 2 inches and about 8 inches, and the thickness of the outer edge 26 of the apron 20 may be between about ½ of an inch and about 7 inches. To illustrate, if the inner edge 30 of the apron 20 is about 3 inches thick, the outer edge 26 of the apron 20 would be about 2 inches thick.

To facilitate easier opening of a utility enclosure cover (not shown), the inner edge 30 of the apron 20 may be angled, e.g., angle β, such that the center opening 28 is larger at the top surface 22 of the apron 20 than the center opening at the bottom surface 24 of the apron. The angle β, seen in FIG. 3, may be in the range of between about 1 degree and about 6 degrees, and is preferably about 3 degrees.

Along the top surface 22 of the apron 20 is a skid resistant surface 32, shown in FIG. 4. The skid resistant surface 32 has a coefficient of friction that is in a range sufficient to limit slipping when, for example, walking on or driving over the apron. As a non-limiting example, the coefficient of friction may be greater than or equal to about 0.5. The skid resistant surface 32 may be formed by fabricating the apron in a mold having a rough surface where the top surface 22 of the apron 20 is formed. In another exemplary embodiment, the skid resistant surface may be a coating, e.g., a textured epoxy polymer coating, applied to the top surface 22.

Embedded within the top surface of the apron 20 may be one or more lift inserts 36 used to facilitate the lifting of the apron 20 using machinery or lifting systems, such as pulley systems, when, for example, installing the apron around a utility enclosure or when removing an apron 20 previously installed around a utility enclosure. Threaded pulling eyes (not shown) can then be inserted into the lift inserts.

Figure 5:
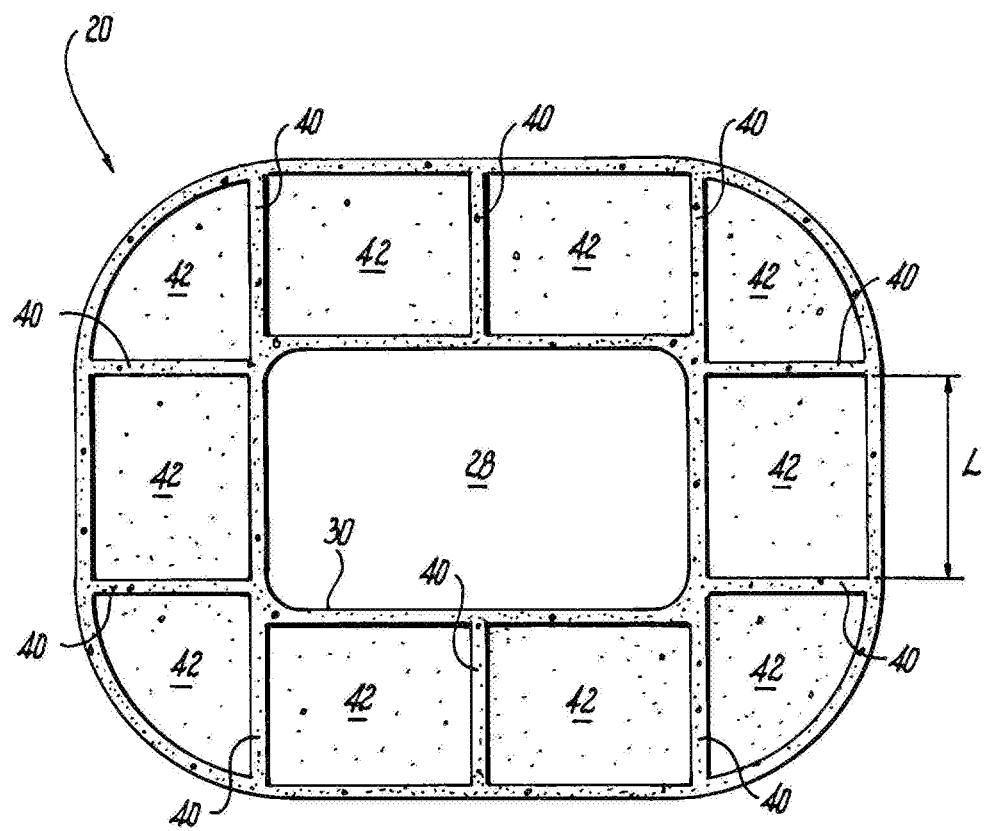
FIG. 5 is a bottom plan view of the utility enclosure apron of FIG. 4.
Figure 6:
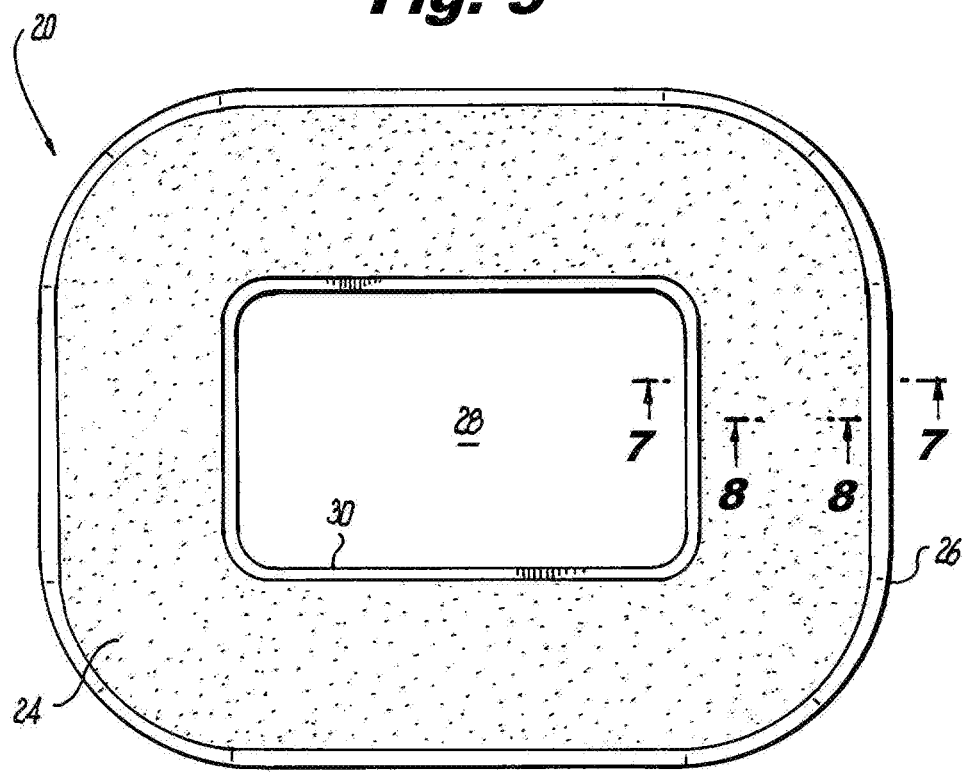
FIG. 6 is a bottom plan view of another exemplary embodiment of the utility enclosure apron according to the present disclosure.
Figure 7:
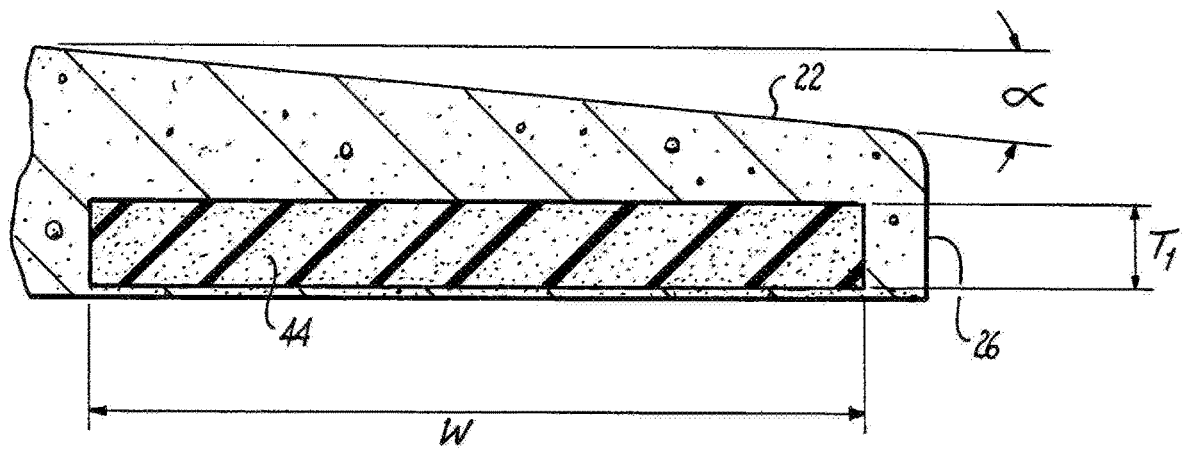
FIG. 7 is a cross-sectional view of the utility enclosure apron of FIG. 6 taken along line 7-7.
Figure 8:
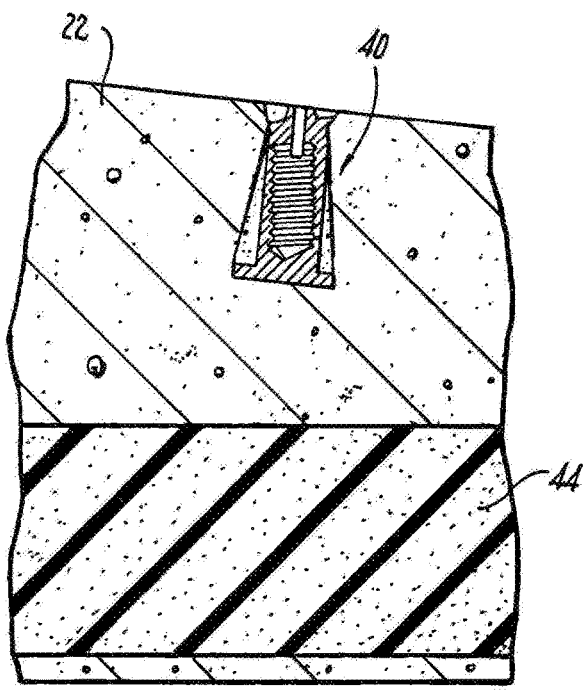
FIG. 8 is a cross-sectional view of the utility enclosure apron of FIG. 6 taken along line 8-8.

In some embodiments, the apron 20 may be fabricated from solid concrete. In other embodiments and to increase the strength of the apron 20, the apron may be fabricated from concrete reinforced with fiberglass sheets. The fiberglass sheets may be, for example, embedded within the concrete near the top surface 22 and the bottom surface 24 of the apron 20. The top perspective view of FIG. 4 and the bottom plan view of FIG. 6, show a solid apron 20 made from concrete or fiberglass reinforced concrete. In other embodiments, and to decrease the weight of the apron 20, the apron may be fabricated from concrete or fiberglass reinforced concrete with lightweight filler members 44, seen in FIGS. 7 and 8. The lightweight filler members include, for example, foam pads, foam boards, balsa wood, etc. In the embodiment shown in FIGS. 7 and 8, the lightweight filler members are rigid foam pads or boards. The foam pads or boards may be made of a lightweight water resistant material. Examples of such lightweight water resistant materials include closed cell PVC foam boards, balsa wood, corrugated cardboard, cellulose board, fiberboard, etc. The bottom plan view of FIG. 5 shows an apron 20 having struts 40 forming filler member chambers 42 in which prefabricated filler members 44, seen in FIGS. 7 and 8, are placed, and then concrete is poured into the chambers 42 and over the filler members 44 embedding the filler members in the concrete. In another embodiment, the filler members can be formed by spraying or otherwise depositing a lightweight material, such as PVC foam, balsa wood, cardboard, cellulose or fiber into the chambers 42 which then hardens into the filler members 44, as shown in FIG. 8. In another embodiment, the filler members 44 may be secured within the filler member chambers 42 using for example adhesives, without filling the filler member chambers 42 with concrete. The number of filler member chambers 42 and the size of each filler member chamber may vary depending upon the desired size of the apron, the desired weight of the apron, and the desired strength of the apron. For example, the filler members 44 may have a length L, seen in FIG. 5, ranging between about 8 inches and about 16 inches, a width W, seen in FIG. 7, ranging between about 8 inches and about 16 inches, and a thickness T ranging between about ¼ of an inch and about 6 inches.

Preferably, the apron has a compressive strength ranging between about 9,000 psi and about 15,000 psi, a flexural strength ranging between about 3,000 psi and about 6,000 psi, a tensile strength ranging between about 800 psi and about 1,100 psi, so that the apron 20 can withstand loads of up to about 22,500 lbs. and can withstand an impact of up to about 52 Nm.

As noted above, the present disclosure also contemplates kits for providing access to underground equipment, such as underground utility equipment. The kit includes the utility enclosure 10 and the apron 20. An example of a utility enclosure 10, shown in FIGS. 1 and 2, includes a box 12 and a cover (not shown). The box 12 may be rectangular in shape, square in shape or circular in shape. In the embodiment shown, the box 12 is rectangular in shape and includes a plurality of walls that include one or more conduit or cable knock-outs. The walls may have vertical supporting members providing additional support to the walls. A rim 14 may extend around the box 12 along the top edge of the walls forming an opening for the cover. The rim 14 may include a ledge 16 upon which the cover rests. The box 12 and cover may include a locking mechanism to lock the cover to the box. The box and cover may be made from one or more of high density polyethylene (HDPE), concrete, etc.

Figure 9:
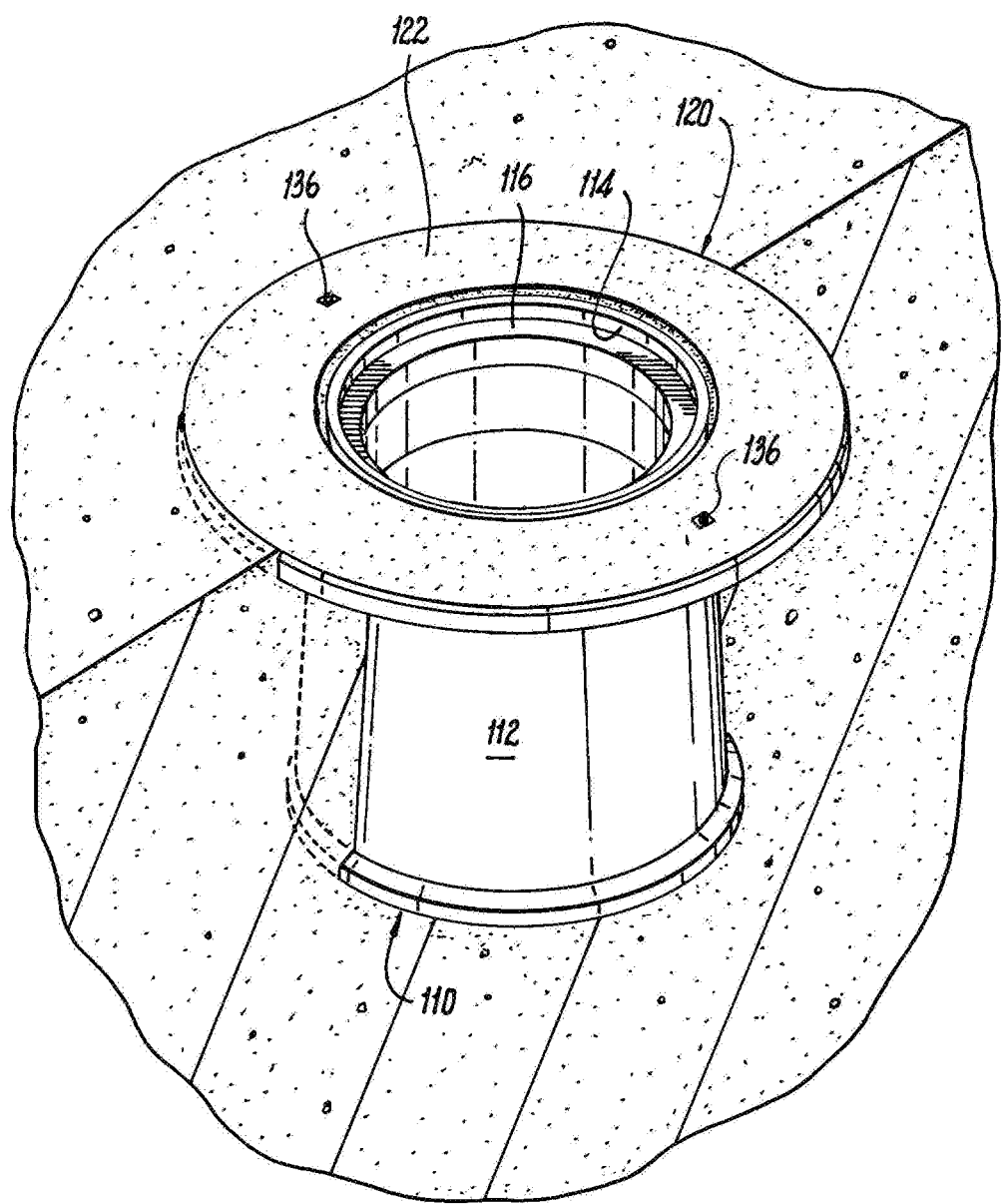
FIG. 9 is a top perspective view of another exemplary embodiment of a precast utility enclosure apron according to the present disclosure positioned around a utility enclosure buried in the ground.
Figure 10:
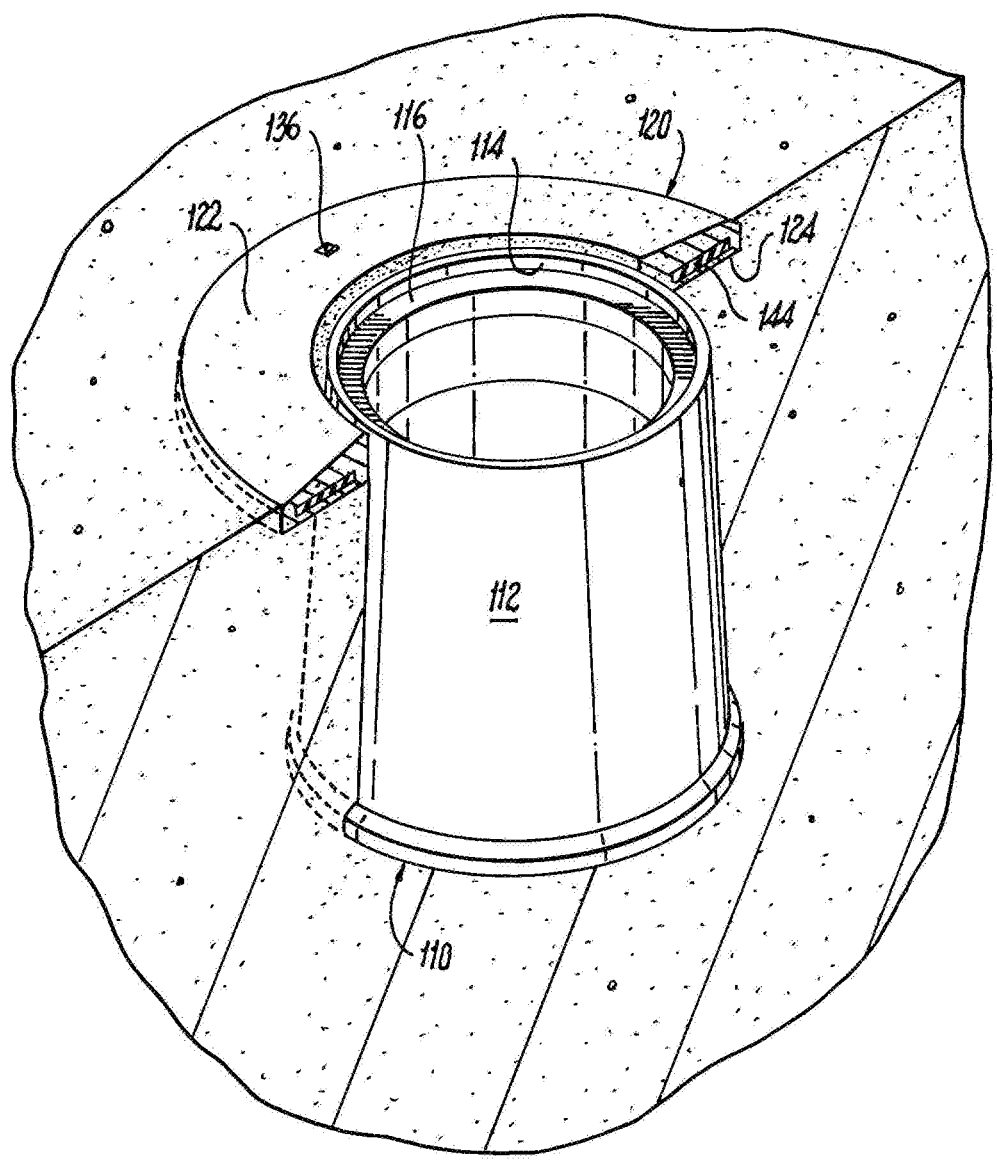
FIG. 10 is a top perspective view with part of the soil removed to reveal a cross-section of the utility enclosure apron of FIG. 9.

Referring now to FIGS. 9-16, another exemplary embodiment of a utility enclosure apron according to the present disclosure is shown and described. In this exemplary embodiment, the utility enclosure 110 includes a box 112 and a cover (not shown). The box 112 in this exemplary embodiment is circular in shape. The apron 120 is also looped member, here a circular loop, configured to fit around a perimeter of a top portion of the box 112, as shown in FIGS. 9 and 10. In this exemplary embodiment, the apron 120 is a continuous loop. The apron 120 serves a number of purposes. For example, the apron 120 acts as a buffer between the utility enclosure 110 and equipment that may impact the side of the utility enclosure, such as a lawn mower. As another example, the apron 120 stabilizes the buried utility enclosure by minimizing disruption to the soil around the utility enclosure.

Figure 11:
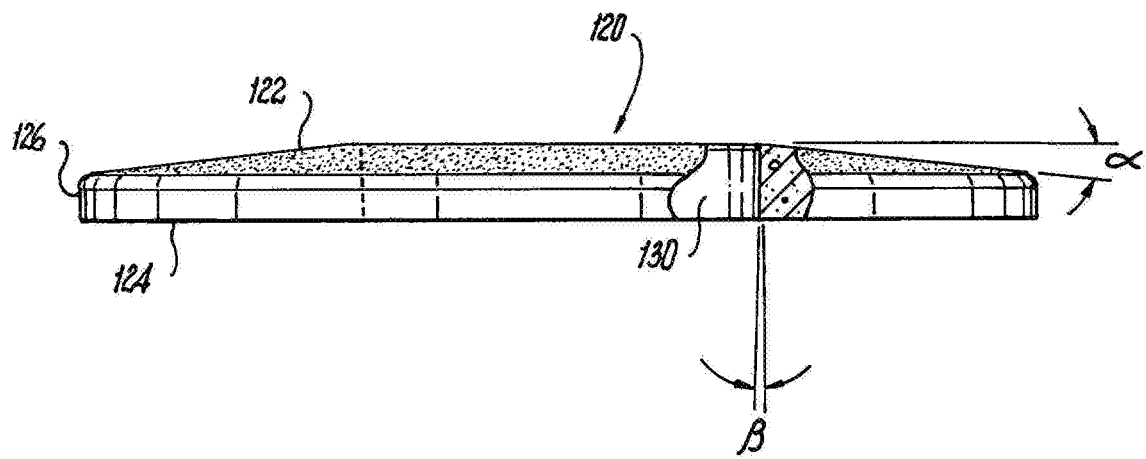
FIG. 11 is a side elevation view of the utility enclosure apron of FIG. 9.
Figure 12:
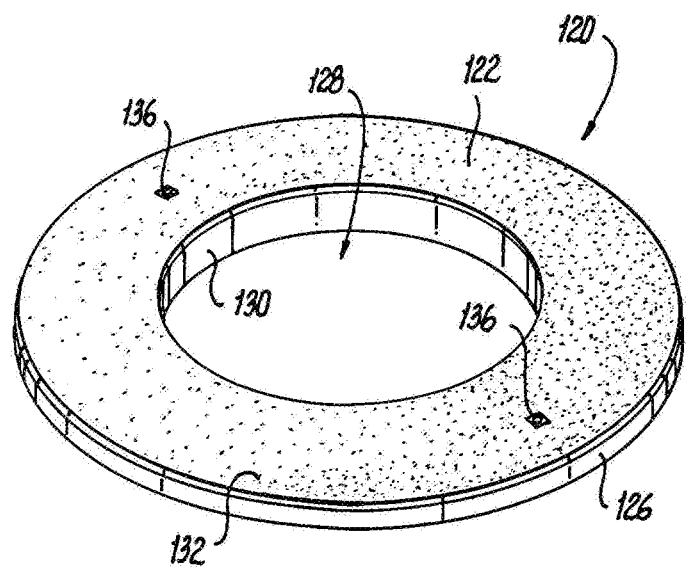
FIG. 12 is a top perspective view of the utility enclosure apron of FIG. 9, illustrating a skid resistant surface formed as part of a top surface of the utility enclosure apron.

Referring to FIGS. 11 and 12, the apron 120 has a top surface 122, a bottom surface 124, an outer edge 126 between the top surface and the bottom surface, a center opening 128 and an inner edge 130 around the center opening 128 and between the top surface and the bottom surface. The top surface 122 is angled or tapered, as seen in FIG. 11, sufficient to allow water, ice and debris to runoff the apron 120 away from the center opening 128. The slope of the top surface 122 may be in the range from about ½ of an inch to about 6 inches, where the slope angle "α" may be, for example, between about 3 degrees and about 15 degrees. As an example, the slope of the top surface 122 may be 1 inch starting from the inner edge 130 and ending at the outer edge 126. Such a slope would generally equate to a slope angle "α" of about 6 degrees. To achieve, for example, a 1-inch slope and maintain the structural integrity of the apron, the thickness of the inner edge 130 of the apron 120 may be between about 2 inches and about 8 inches, and the thickness of the outer edge 126 of the apron 120 may be between about ½ of an inch and about 7 inches. To illustrate, if the inner edge 130 of the apron 120 is about 3 inches thick, the outer edge 126 of the apron 120 would be about 2 inches thick.

To facilitate easier opening of a utility enclosure cover (not shown), the inner edge 130 of the apron 120 may be angled, e.g., angle β, such that the center opening 128 is larger at the top surface 122 of the apron 120 than the center opening at the bottom surface 124 of the apron. As a non-limiting example, the angle β, seen in FIG. 11, may be in the range of between about 1 degree and about 6 degrees, and is preferably about 3 degrees.

Along the top surface 122 of the apron 120 is a skid resistant surface 132, shown in FIG. 12. The skid resistant surface 132 has a coefficient of friction that is in a range sufficient to limit slipping when, for example, walking on or driving over the apron. As a non-limiting example, the coefficient of friction may be greater than or equal to about 0.5. The skid resistant surface 132 may be formed by fabricating the apron in a mold having a rough surface where the top surface 122 of the apron 120 is formed. In another exemplary embodiment, the skid resistant surface may be a coating, e.g., a textured epoxy polymer coating, applied to the top surface 122.

Embedded within the top surface of the apron 120 may be one or more lift inserts 136 used to facilitate the lifting of the apron 120 using machinery or lifting systems, such as pulley systems, when, for example, installing the apron around a utility enclosure or when removing an apron 120 previously installed around a utility enclosure. Threaded pulling eyes (not shown) can then be inserted into the lift inserts.

Figure 13:
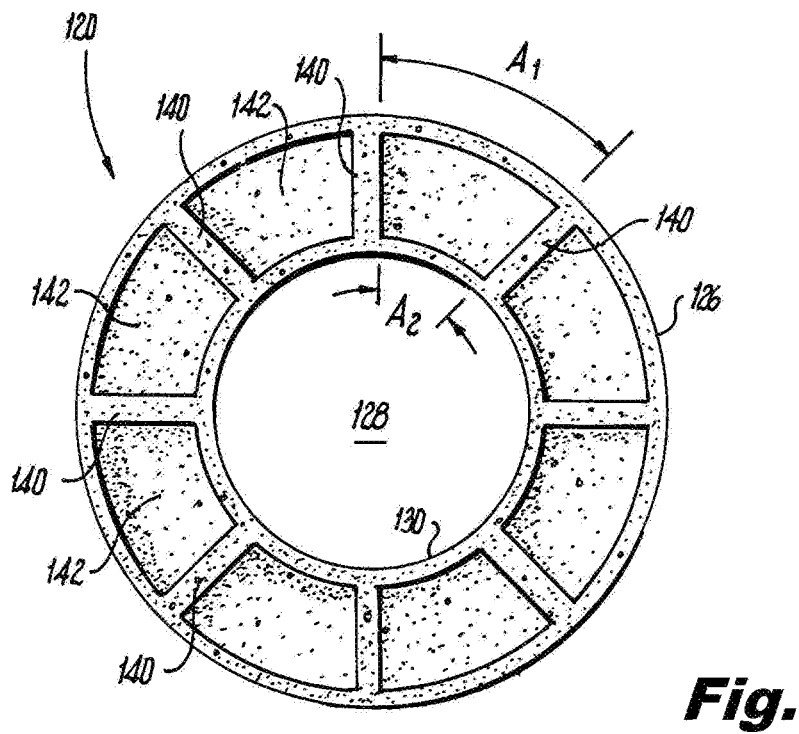
FIG. 13 is a bottom plan view of the utility enclosure apron of FIG. 9.
Figure 14:
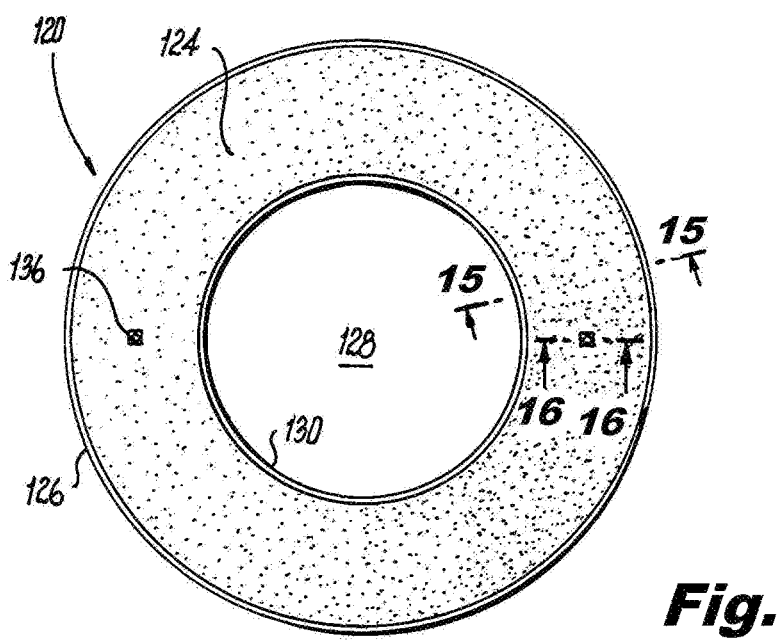
FIG. 14 is a top plan view of the utility enclosure apron of FIG. 9.
Figure 15:
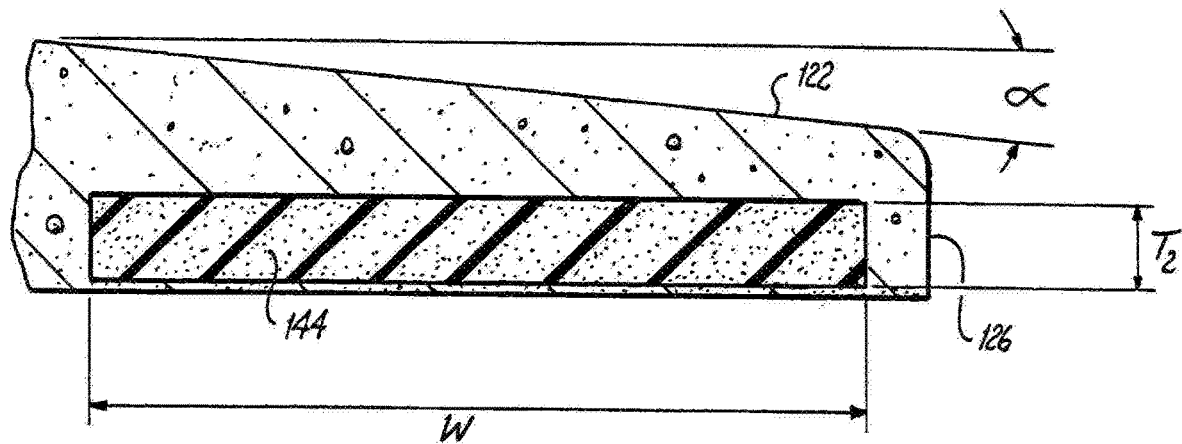
FIG. 15 is a cross-sectional view of the utility enclosure apron of FIG. 14 taken along line 15-15.
Figure 16:
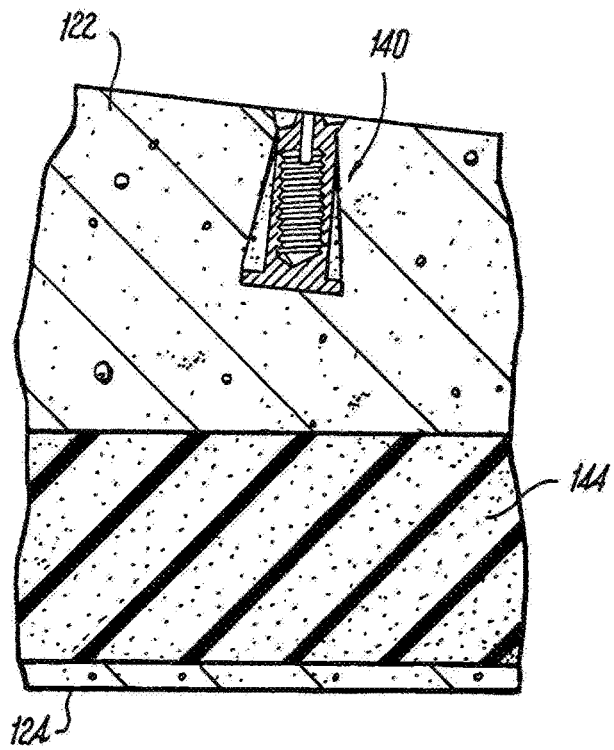
FIG. 16 is a cross-sectional view of the utility enclosure apron of FIG. 14 taken along line 16-16.

In some embodiments, the apron 120 may be fabricated from solid concrete. In other embodiments and to increase the strength of the apron 120, the apron may be fabricated from concrete reinforced with fiberglass sheets. The fiberglass sheets may be, for example, embedded within the concrete near the top surface 122 and the bottom surface 124 of the apron 120. The top perspective view of FIG. 12 and the bottom plan view of FIG. 14 show a solid apron 120 made from concrete or fiberglass reinforced concrete. In other embodiments, and to decrease the weight of the apron 120, the apron may be fabricated from concrete or fiberglass reinforced concrete with lightweight filler members 144, seen in FIGS. 10 and 15. The lightweight filler members include, for example, foam pads, foam boards, balsa wood, etc. In the embodiment shown in FIGS. 10 and 15, the lightweight filler members are rigid foam pads or boards. The foam pads or boards may be made of a lightweight water resistant material. Examples of such lightweight water resistant materials include closed cell PVC foam boards, balsa wood, corrugated cardboard, cellulose board, fiberboard, etc. The bottom plan view of FIG. 13 shows an apron 120 having struts 140 forming filler member chambers 142 in which prefabricated filler members 144, seen in FIG. 15, can be placed, and then concrete is poured into the chambers 142 and over the filler members 144 embedding the filler members in the concrete. In another embodiment, the filler members can be formed by spraying or otherwise depositing a lightweight material, such as PVC foam, balsa wood, cardboard, cellulose or fiber into the chambers 142 which then hardens into the filler members 144. In another embodiment, the filler members 144 may be secured within the filler member chambers 142 using for example adhesives, without filling the filler member chambers 142 with concrete. The number of struts 140 and thus the number of filler member chambers 142 and the size of each filler member chamber may vary depending upon the desired size of the apron, the desired weight of the apron, and the desired strength of the apron. For example, the struts 140 may extend between the outer edge 126 and the inner edge 130 and positioned radially at predefined intervals, as seen in FIG. 13. In the embodiment shown, the struts are positioned at 45 degree intervals resulting in eight (8) filler member chambers 142, seen in FIG. 13. Due to the circular shape of the apron 120 in this exemplary embodiment, the filler member chambers 142 are wedge like shapes with an outer arc length $A_1$ and an inner arc length $A_2$. The arc lengths are defined by the number and position of the struts 140 and the radius of the circular apron. The thickness $T_2$ of the filler member chamber may range, for example, between about 0.25 inches and about 6 inches.

Preferably, the apron 120 has a compressive strength ranging between about 9,000 psi and about 15,000 psi, a flexural strength ranging between about 3,000 psi and about 6,000 psi, a tensile strength ranging between about 800 psi and about 1,100 psi, so that the apron can withstand loads of up to about 22,500 lbs. and can withstand an impact of up to about 52 Nm.

As noted above, the present disclosure also contemplates kits for providing access to underground equipment, such as underground utility equipment. In this exemplary embodiment, the kit includes the utility enclosure 110 and the apron 120. An example of a utility enclosure 110, shown in FIGS. 9 and 10, includes a box 12 and a cover (not shown). In this exemplary embodiment, the box 112 is circular in shape and includes a continuous wall that may include one or more conduit or cable knock-outs. The wall may have vertical supporting members providing additional support to the wall. A rim 114 may extend around the box 112 along the top edge of the wall forming an opening for the cover. The rim 114 may include a ledge 116 upon which the cover rests. The box 112 and cover may include a locking mechanism to lock the cover to the box. The box and cover may be made from one or more of high density polyethylene (HDPE), concrete, etc.

Figure 17:
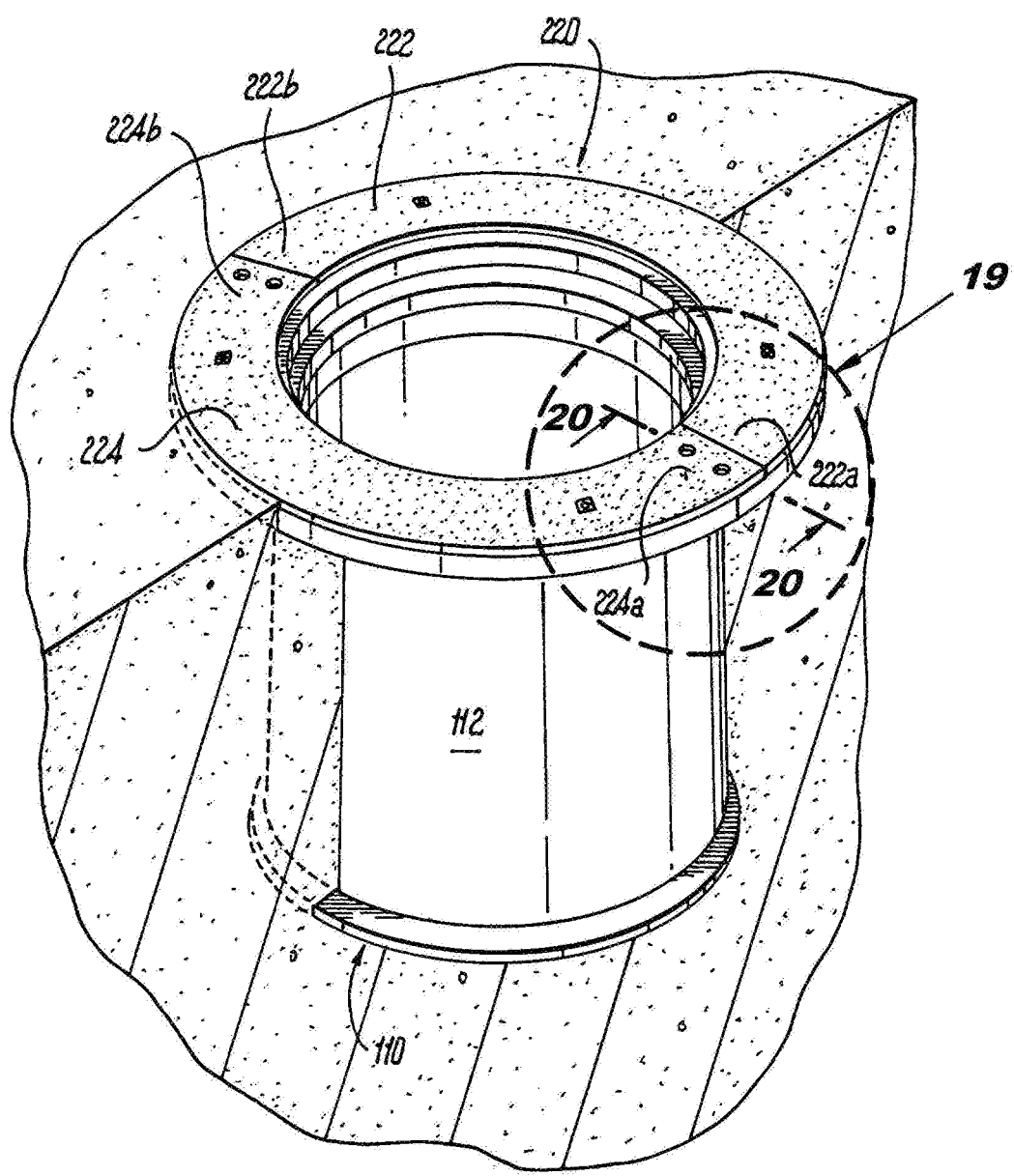
FIG. 17 is a top perspective view of another exemplary embodiment of a precast utility enclosure apron according to the present disclosure positioned around a utility enclosure buried in the ground.
Figure 18:
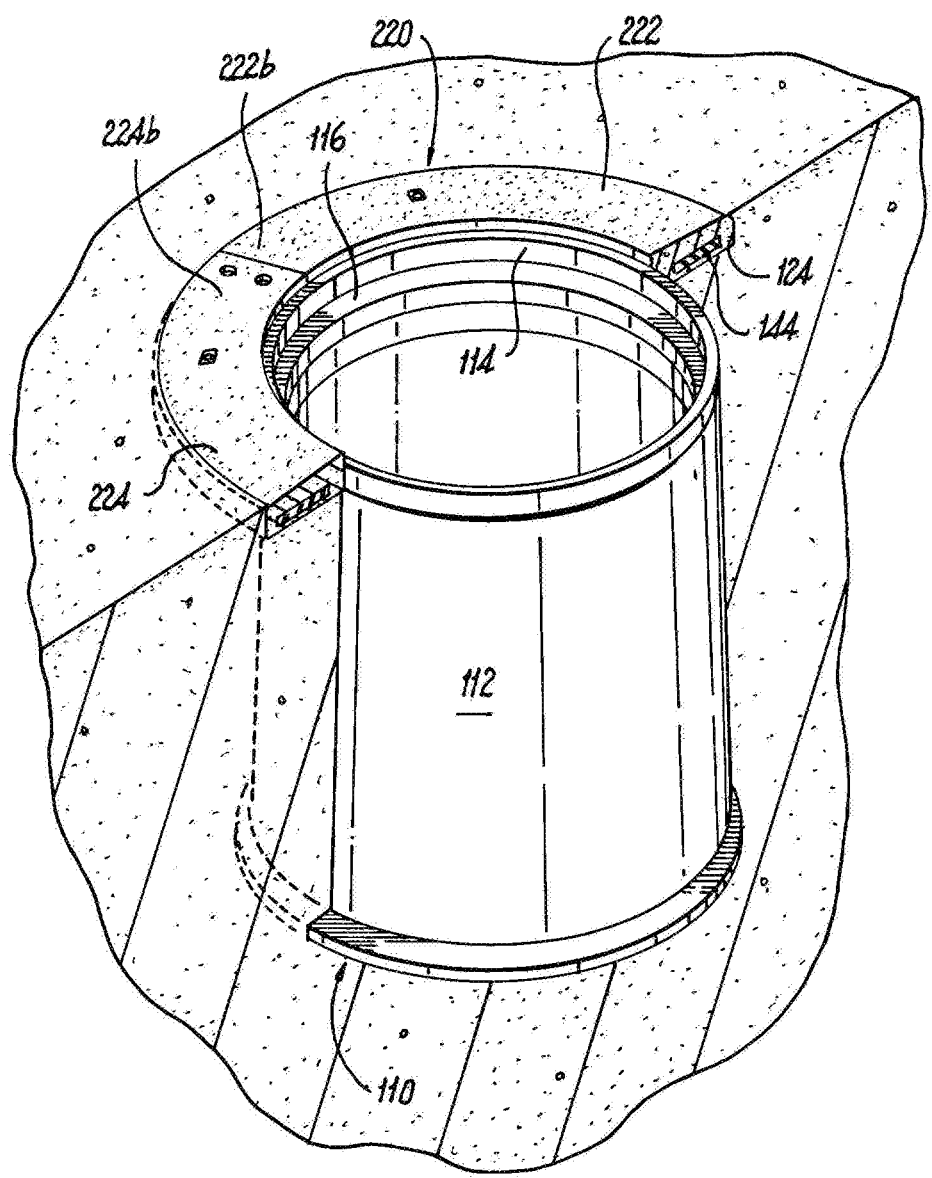
FIG. 18 is a top perspective view with part of the soil removed to reveal a cross-section of the utility enclosure apron of FIG. 17.
Figure 19:
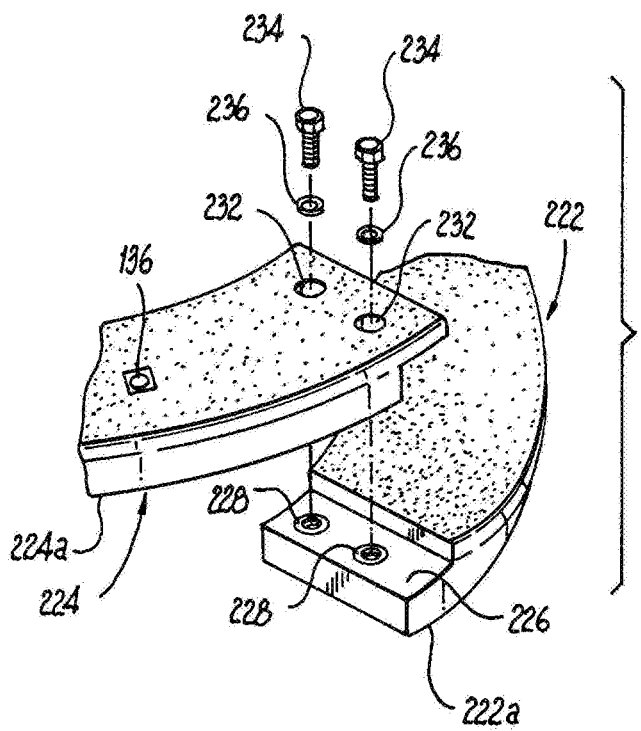
FIG. 19 is a top perspective view of a portion of the utility enclosure apron of FIG. 17.

Referring now to FIGS. 17-21, another exemplary embodiment of the apron according to the present disclosure is shown. In this exemplary embodiment, the utility enclosure 110 is the same as the utility enclosure described above and for ease of description is not repeated. The apron 220 is also looped member, here a circular loop, configured to fit around a perimeter of a top portion of the box 212, as shown in FIGS. 17 and 18. The apron 220 is substantially similar to the apron 120, except that the apron is a split apron having a first apron portion 222 and a second apron portion 224. The first apron portion 222 has a first end 222a and a second end 222b, and the second apron portion 224 has a first end 224a and a second end 224b. In this exemplary embodiment, the first end 222a of the first apron portion 222 has a notch 226 and one or more inserts 228 embedded within the notch and accessible from a top surface of the notch, as shown in FIG. 19. The one or more inserts 228 are configured to receive a fastener, such as a threaded bolt, and are used to secure the first apron portion 222 to the second apron portion 224. The first end 224a of the second apron portion 224 has a notched overhang 230 that mates with the notch 228 in the first end 222a of the first apron portion 222. The notched overhang 230 includes one or more mounting apertures 232 used to secure the first end 224a of the second apron portion to the first end 222a of the first apron portion 222. Preferably, the mounting apertures 232 are countersunk so that fastener used to secure the apron portions together is recessed within the mounting aperture. The second end 222b of the first apron portion 222 and the second end 224b of the second apron portion 224 would be configured the same as the first apron portion 222.

Figure 20:
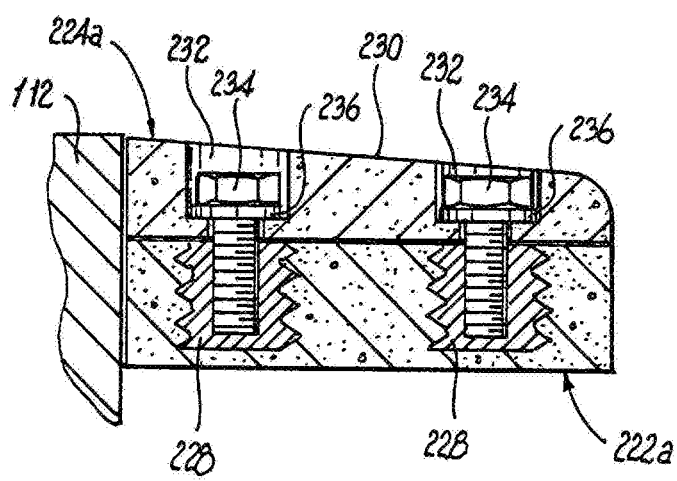
FIG. 20 is a cross-sectional view of the utility enclosure apron of FIG. 17 taken along line 20-20.
Figure 21:
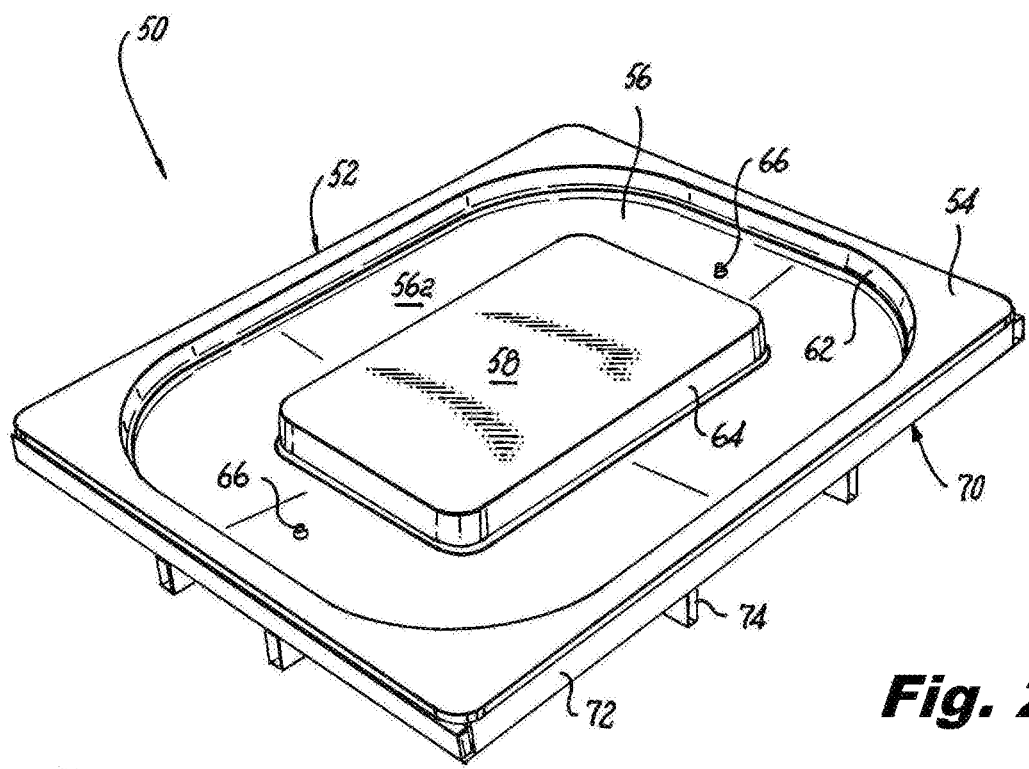
FIG. 21 is a top perspective view of a mold for fabricating the utility enclosure apron of the present disclosure.
Figure 22:
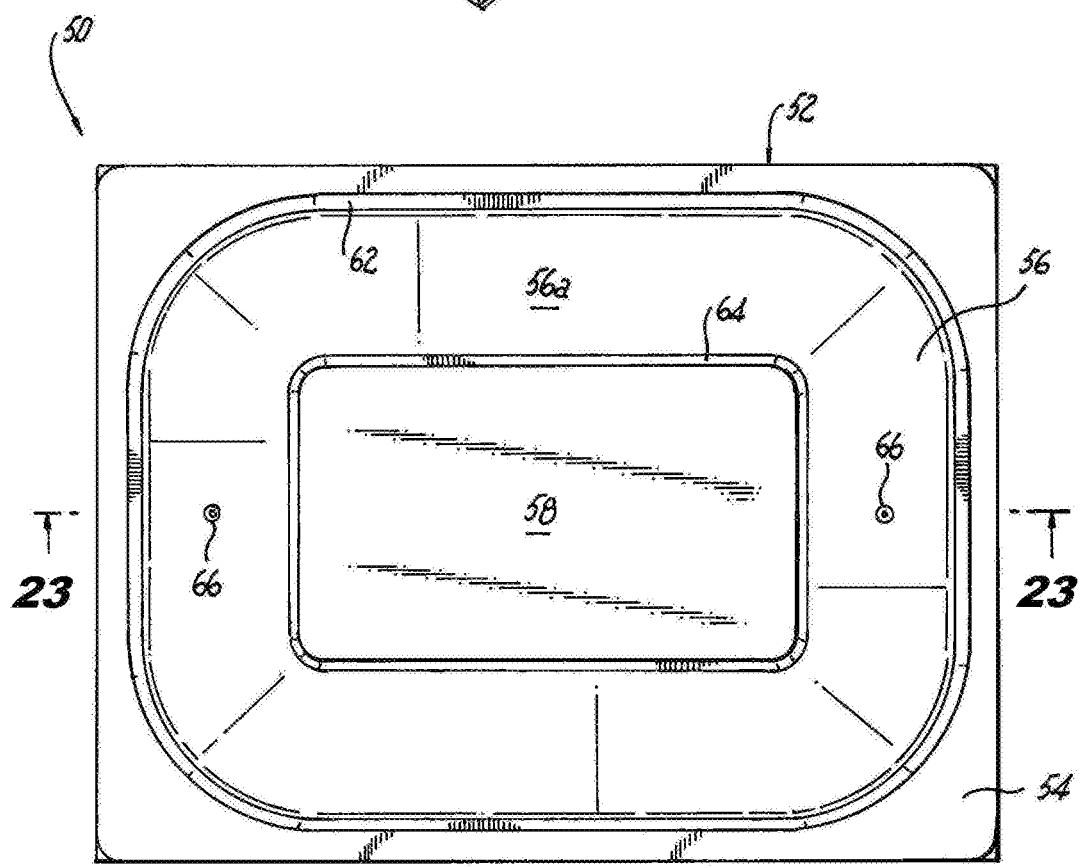
FIG. 22 is a top plan view of the mold of FIG. 21.

To secure the first apron portion 222 to the second apron portion 224, the notch overhang 230 of the first end 224a of the second end portion 224 is mated with the first end 222a of the first apron portion 222. One or more threaded bolts 234 and one or more corresponding washers 236 are inserted into the one or more mounting apertures 232, as shown in FIG. 19, and the bolts extend through the notched overhang 230. The bolts 234 are then threaded into the inserts 228 embedded in the notch 226 in the first end 222a of the first apron portion 222 and tightened, as seen in FIG. 20.

Similar to the embodiments of FIGS. 9-16, the apron 220 may be fabricated from, for example, solid concrete, concrete reinforced with fiberglass sheets, concrete with lightweight filler members 144, or fiberglass reinforced concrete with lightweight filler members 144. In embodiments where the filler members are used, the number of struts 140 and thus the number of filler member chambers 142 and the size of each filler member chamber may vary depending upon the desired size of the apron portions, the desired weight of the apron portions, and the desired strength of the apron portions, similar to that described above.

As noted above, the present disclosure also contemplates kits for providing access to underground equipment, such as underground utility equipment. In this exemplary embodiment, the kit includes the utility enclosure 110 and the apron 220 described above.

Figure 23:
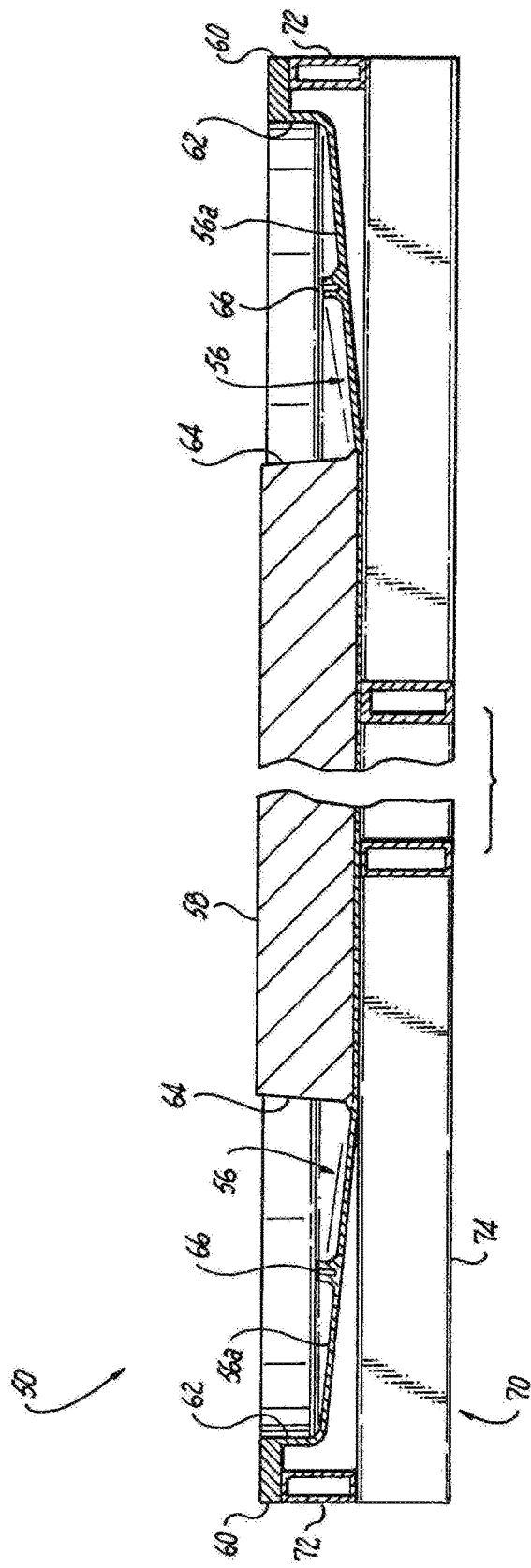
FIG. 23 is a cross-sectional view of the mold of FIG. 21 taken along line 23-23 of FIG. 22.
Figure 24:
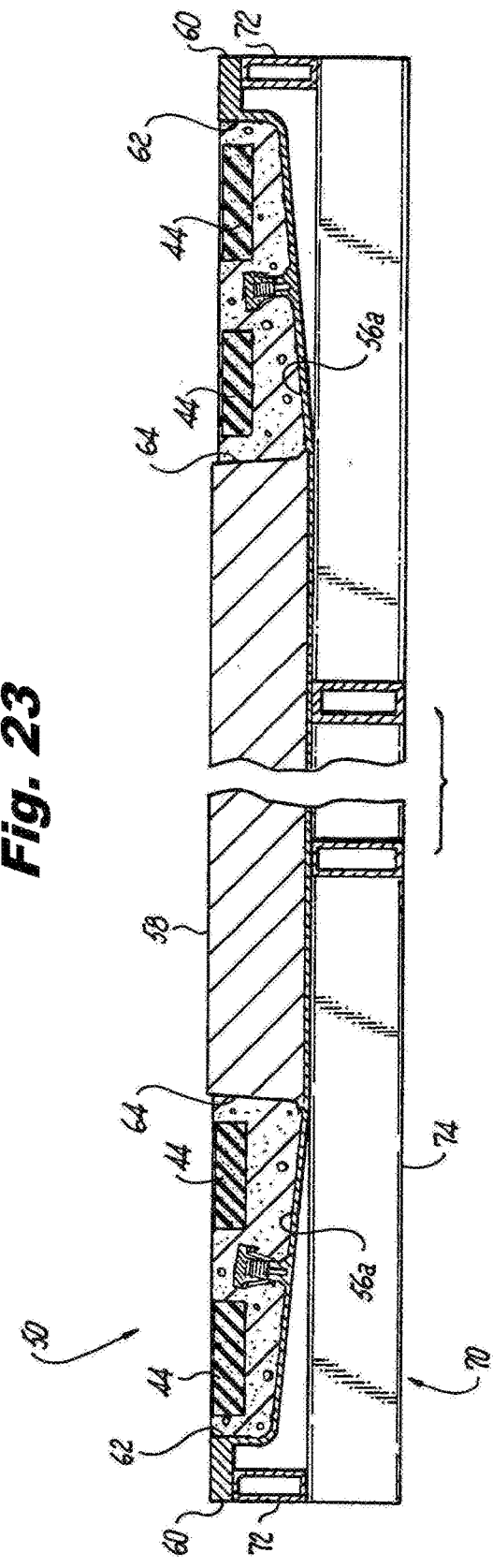
FIG. 24 is a cross-sectional view of the mold of FIG. 21 with polymer cement poured into the mold and filler members embedded in the polymer cement.

Turning now to FIGS. 21-24, an exemplary embodiment of a mold 50 for fabricating the apron 20 of the present disclosure is shown. In this embodiment, the mold is a top-down mold where the top surface 22 of the apron 20 is formed by the mold. The mold 50 has a tub 52 that rests within a frame 70, seen in FIG. 21. The tub 52 has a support member 54, a recess 56 and a center rib 58. The support member 54 has a ledge 60, seen in FIG. 23, which extends around the perimeter of the support member 54. The ledge 60 is configured to rest on the frame 70, as seen in FIGS. 23 and 24. The support member 54 has a wall 62 that forms the outer edge 26 of the apron 20, seen in FIGS. 1 and 4. The center rib 58 forms the center opening 28 of the apron 20 and includes a wall 64 that forms the inner edge 30 of the apron 20. A face 56a of the recess 56 forms the top surface 22 of the apron 20. The face 56a of the mold 50 may be formed with a rough surface to impart the skid resistant surface 32 on the top surface of the apron 20. As seen in FIG. 23, the face 56a of the recess 56 is tapered so that the width of the recess is at its greatest at the wall 64 of the center rib 58, and so that the width of the recess is narrower at the wall 62 of the support member 54. The tapered face 56a of the recess 56 is tapered to form the tapered shape in the top surface 22 of the apron 20 that facilitates water, ice and debris runoff. To create openings to fit the lift inserts 36 in the apron 20 described above, the center of the recess 56 may include one or more plugs 66, seen in FIG. 22. In this exemplary embodiment of a top-down mold 50, once concrete is poured into the recess, a bull float, screed or trowel can be used to level the concrete relative to the support member 54 and center rib 58 to form the bottom surface 24 of the apron, which is typically flat. The mold 50 according to the present disclosure can be fabricated from a composite material that includes a tooling gel coat surface, a tooling resin and chopped fiberglass strands.

The frame 70 of the mold 50 can be made of any suitable material sufficient to support the mold 50 and the weight of the concrete forming the apron 20. For example, the frame can be made of hollow steel tubing or bars that may be square, rectangular or round in shape. In this exemplary embodiment, the frame 70 includes a rectangular tub support 72 that is secured to a grid shaped base 74, as shown.

To precast a concrete apron 20, concrete is poured into the recess 56 of the mold 50 until the concrete fills the recess. Excess concrete is removed using a bull float, screed or trowel and the concrete is leveled relative to the support member 54 and center rib 58 to form the bottom surface 24 of the apron. The concrete is then allowed, for example, to set for about 0.25 hours at which time the apron can be removed from the mold 50.

To precast a fiberglass reinforced concrete apron 20, a layer, e.g., about 1/8 of an inch thick, of concrete is poured into the recess 56 of the mold 50. A fiberglass sheet is then laid on the concrete and additional concrete is poured into the mold covering the fiberglass sheet until about a 1/8 inch remains before the recess is filled with concrete. A second fiberglass sheet is then laid on the concrete and additional concrete is poured into the mold 50 covering the fiberglass sheet until the concrete fills the recess 56. Excess concrete is removed using a bull float, screed or trowel and the concrete is leveled relative to the support member 54 and center rib 58 to form the bottom surface 24 of the apron. The concrete is then allowed, for example, to set for about 0.25 hours at which time the apron can be removed from the mold.

To precast a lightweight fiberglass reinforced concrete apron 20, a layer, e.g., about 1/8 of an inch thick, of concrete is poured into the recess 56 of the mold 50. A fiberglass sheet is then laid on the concrete and additional concrete is poured into the mold covering the fiberglass sheet until about 1/8 of an inch remains before the recess is filled with concrete. One or more filler members 44, e.g., one or more lightweight foam pads or blocks, are then positioned in the recess 56 on the concrete. Additional concrete is poured into the recess until the concrete covers the filler members and fills the recess 56. Excess concrete is removed using a bull float, screed or trowel and the concrete is leveled relative to the support member 54 and center rib 58 to form the bottom surface 24 of the apron. The concrete is then allowed, for example, to set for about 0.25 hours at which time the apron can be removed from the mold.

While the mold and method for fabricating the apron according to the present disclosure is shown and described with reference to apron shape of FIG. 1, one skilled in the are would readily appreciate the type, configuration and size of a mold needed to fabricate the other embodiments of the apron described herein and those also contemplated by the present disclosure. Further, while illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A utility enclosure apron comprising:
   a looped member formed of a concrete material, the looped member having a top surface, a bottom surface, an outer edge between the top surface and the bottom surface, a center opening and an inner edge between the top surface and the bottom surface around the center opening; and
   at least one filler member formed of lightweight foam encased within the looped member such that the at least one filler member is surrounded on all sides by the concrete material.

2. The utility enclosure apron according to claim 1, wherein the thickness of the inner edge is between about 2 inches and about 8 inches.

3. The utility enclosure apron according to claim 1, wherein the thickness of the outer edge is between about 1/2 of an inch and about 7 inches.

4. The utility enclosure apron according to claim 1, wherein a thickness of the inner edge is greater than a thickness of the outer edge to form a taper.

5. The utility enclosure apron according to claim 1, wherein at least a portion of the top surface further comprises a skid resistant surface.

6. The utility enclosure apron according to claim 1, wherein at least one lift insert is embedded within the looped member and accessible from the top surface.

7. The utility enclosure apron according to claim 1, wherein a plurality of lift inserts are embedded within the looped member and accessible from the top surface.

8. The utility enclosure apron according to claim 1, wherein the at least one filler member is embedded within the looped member adjacent the bottom surface.

9. The utility enclosure apron according to claim 1, wherein the looped member is formed of concrete.

10. The apron according to claim 1, wherein the looped member is formed of polymer concrete.

11. The utility enclosure apron according to claim 1, wherein the looped member is formed of polymer concrete reinforced with fiberglass.

12. The utility enclosure apron according to claim 1, wherein the looped member is formed as a continuous loop.

13. The utility enclosure apron according to claim 1, wherein the looped member is formed by securing multiple portions together.

14. The utility enclosure apron according to claim 4, wherein an angle of the taper is between about 3 degrees and about 15 degrees.

15. A utility enclosure kit comprising:
   a utility enclosure configured for underground installation; and
   a utility enclosure apron configured to be positioned to surround a top surface of the utility enclosure, the apron including:
      a looped member formed of a concrete material, the looped member having a top surface, a bottom surface, an outer edge between the top surface and the bottom surface, a center opening and an inner edge between the top surface and the bottom surface around the center opening, wherein the center opening is configured to fit around a top portion of the utility enclosure; and at least one filler member formed of lightweight foam encased within the looped member so that the at least one filler member is surrounded on all sides by the concrete material.

16. The utility enclosure kit according to claim 15, wherein the thickness of the inner edge is between about 2 inches and about 8 inches.

17. The utility enclosure kit according to claim 15, wherein the thickness of the outer edge is between about ½ of an inch and about 7 inches.

18. The utility enclosure kit according to claim 15, wherein at least a portion of the top surface further comprises a skid resistant surface.

19. The utility enclosure kit according to claim 15, wherein at least one lift insert is embedded within the looped member and accessible from the top surface.

20. The utility enclosure kit according to claim 15, wherein a plurality of lift inserts are embedded within the looped member and accessible from the top surface.

21. The utility enclosure kit according to claim 15, wherein the at least one filler member is embedded within the looped member adjacent the bottom surface.

22. The utility enclosure kit according to claim 15, wherein the looped member is formed of concrete.

23. The utility enclosure kit according to claim 15, wherein the looped member is formed of polymer concrete.

24. The utility enclosure kit according to claim 15, wherein the looped member is formed of polymer concrete reinforced with fiberglass.

25. The utility enclosure kit according to claim 15, wherein the looped member is formed as a continuous loop.

26. The utility enclosure apron according to claim 15, wherein the looped member is formed by securing multiple portions together.

27. The utility enclosure apron according to claim 15, wherein a thickness of the inner edge is greater than a thickness of the outer edge to form a taper.

28. The utility enclosure kit according to claim 27, wherein an angle of the taper is between about 3 degrees and about 15 degrees.

29. A utility enclosure apron comprising a looped member formed of polymer concrete reinforced with fiberglass and a lightweight filler material encased within the polymer concrete reinforced with fiberglass so that the lightweight filler material is surrounded on all sides by the polymer concrete reinforced with fiberglass, the looped member having a top surface, a bottom surface, an outer edge between the top surface and the bottom surface, a center opening and an inner edge between the top surface and the bottom surface around the center opening.

30. The utility enclosure apron according to claim 29, wherein a thickness of the inner edge is greater than a thickness of the outer edge to form a taper.

31. The utility enclosure apron according to claim 29, wherein at least one lift insert is embedded within the looped member and accessible from the top surface.

32. The utility enclosure apron according to claim 29, wherein a plurality of lift inserts are embedded within the looped member and accessible from the top surface.

33. The utility enclosure apron according to claim 29, wherein at least a portion of the top surface further comprises a skid resistant surface.

* * * * *